US012684317B2

(12) United States Patent
Yamaoka et al.

(10) Patent No.: US 12,684,317 B2
(45) Date of Patent: Jul. 14, 2026

(54) TARGET OBJECT MANAGEMENT SYSTEM, TARGET OBJECT MANAGEMENT SERVER, AND TARGET OBJECT MANAGEMENT METHOD

(71) Applicant: TOPPAN Holdings Inc., Tokyo (JP)

(72) Inventors: Keinosuke Yamaoka, Tokyo (JP); Takamitsu Nakabayashi, Tokyo (JP)

(73) Assignee: TOPPAN Holdings Inc., Tokyo (JP)

( * ) Notice: Subject to any disclaimer, the term of this patent is extended or adjusted under 35 U.S.C. 154(b) by 364 days.

(21) Appl. No.: 18/504,331

(22) Filed: Nov. 8, 2023

(65) Prior Publication Data

US 2024/0073657 A1      Feb. 29, 2024

Related U.S. Application Data

(63) Continuation of application No. PCT/JP2022/020064, filed on May 12, 2022.

(30) Foreign Application Priority Data

May 12, 2021      (JP) ................................. 2021-081205

(51) Int. Cl.
  *H04W 4/35*      (2018.01)
  *H04W 4/38*      (2018.01)
(52) U.S. Cl.
  CPC ............... *H04W 4/35* (2018.02); *H04W 4/38* (2018.02)
(58) Field of Classification Search
  CPC ......... H04W 4/029; H04W 4/80; H04W 4/38; H04W 4/02; H04W 4/35
  See application file for complete search history.

(56) References Cited

U.S. PATENT DOCUMENTS

2010/0060455 A1* 3/2010 Frabasile ............. G06Q 10/087
                                                                340/5.92
2015/0048942 A1* 2/2015 Bertagna ................ A43B 13/38
                                                                340/539.13
(Continued)

FOREIGN PATENT DOCUMENTS

CN          111601244 A  *  8/2020 .............. H04W 4/33
JP          2020-123989        8/2020
(Continued)

OTHER PUBLICATIONS

International Search Report issued in International Application No. PCT/JP2022/020064 dated Jul. 19, 2022.

*Primary Examiner* — Dung Hong
(74) *Attorney, Agent, or Firm* — Maier & Maier, PLLC

(57)          ABSTRACT

A target object management system includes a first device attached to a target object and configured to transmit and receive data to and from an access point in a predetermined first communication range by a communication system of a LPWA, a second device attached to the target object and configured to transmit and receive data to and from a predetermined terminal in a second communication range narrower than the first communication range of the first device by a communication system different from the LPWA, and a management server configured to detect a position of the target object from a first installation position at which the access point is installed and a second installation position at which the terminal is installed. The management server is configured to manage first identification information for identifying the first device and second identification information for identifying the second device in association with each other.

5 Claims, 7 Drawing Sheets

(56)           References Cited

U.S. PATENT DOCUMENTS

| | | | |
|---|---|---|---|
| 2015/0134383 A1* | 5/2015 | Lee ....................... | G01S 5/0294 |
| | | | 705/7.12 |
| 2017/0332326 A1* | 11/2017 | Raghavan ............... | H04W 4/80 |
| 2020/0275635 A1* | 9/2020 | Deliou ................. | A01K 29/005 |
| 2022/0014878 A1* | 1/2022 | Lee ....................... | H04W 76/14 |
| 2023/0333257 A1* | 10/2023 | Russek-Sobol ......... | G01S 19/14 |

FOREIGN PATENT DOCUMENTS

| | | | | |
|---|---|---|---|---|
| JP | 2020-136985 | 8/2020 | | |
| WO | WO-2008005012 A1 * | 1/2008 | ............... | G08G 1/20 |

* cited by examiner

FIG. 3

USER IDENTIFICATION INFORMATION

| FIRST IDENTIFICATION INFORMATION | SECOND IDENTIFICATION INFORMATION | TARGET OBJECT INFORMATION | TARGET OBJECT FIRST POSITION INFORMATION | TARGET OBJECT SECOND POSITION INFORMATION | FIRST DEVICE SET VALUE INFORMATION | FIRST DEVICE OPERATING FLAG |
|---|---|---|---|---|---|---|
| ****** | ****** | ****** | ****** | ****** | ****** | ****** |
| ****** | ****** | ****** | ****** | ****** | ****** | ****** |
| ****** | ****** | ****** | ****** | ****** | ****** | ****** |
| ... | ... | ... | ... | ... | ... | ... |

TARGET OBJECT MANAGEMENT SYSTEM, TARGET OBJECT MANAGEMENT SERVER, AND TARGET OBJECT MANAGEMENT METHOD

CROSS REFERENCE TO RELATED APPLICATIONS

This application is a continuation application based on PCT International Patent Application No. PCT/JP2022/020064, filed on May 12, 2022, which claims priority to Japanese Patent Application No. 2021-081205, filed on May 12, 2021, in the Japan Patent Office. The contents of both the Japanese Patent Application and the PCT Application are incorporated herein by reference.

FIELD OF THE INVENTION

The present invention relates to a target object management system, a target object management server, and a target object management method.

Priority is claimed on Japanese Patent Application No. 2021-081205, filed May 12, 2021, the content of which is incorporated herein by reference.

DESCRIPTION OF RELATED ART

In recent years, in the transport of a load or the like, a position of a load, which is a target object to be delivered and moved, is detected to check a transport status (see, for example, Japanese Unexamined Patent Application, First Publication No. 2020-136985).

In Japanese Unexamined Patent Application, First Publication No. 2020-136985, a communication system of a low power wide area (LPWA) is used as a communication module.

Then, the LPWA has a very slow transmission speed as compared to a cellular line, such as a 4G line, or a wireless local area network (LAN), but can transmit and receive data in a wide range.

In addition, the LPWA has a characteristic that a frequency bandwidth is also narrow and the consumption of the power is extremely low because a radio wave intensity is weak.

For this reason, it is possible to efficiently detect a position of the target object over a long period by using a small number of access points.

However, as described so far, in a communication device described in Patent Document 1, a reception sensitivity is changed smoothly because the radio wave intensity of the LPWA is weak.

Therefore, it is difficult to estimate the position based on radio wave intensity, and it is possible to determine the presence within a communicable area with the access point. It is not possible to execute accurate position detection, such as where the position within the communicable area is.

In addition, in the LPWA, in a case in which the target object is present between the access point and another access point, it is possible to determine that the target object is present in an area in which the communicable areas of both access points overlap.

However, in a case in which an obstacle is present between the access points, the communication device cannot execute communication with one access point, and can only determine that the target object is present in the communicable area of the other access point.

For this reason, it is not possible to determine in which direction an area in which the target object on which the communication device is mounted is present, with respect to the access point.

The present invention has been made in view of such circumstances, and is to provide a target object management system, a target object management server, and a target object management method capable of executing position detection as to which position (location) the target object is within the communicable area of the LPWA.

SUMMARY OF INVENTION

The present invention has been made to solve the above-described problems, and a target object management system according to the present invention includes a first device attached to a target object and configured to transmit and receive data to and from an access point in a predetermined first communication range by a communication system of a low power wide area (LPWA), a second device attached to the target object and configured to transmit and receive data to and from a predetermined terminal in a second communication range narrower than the first communication range of the first device by a communication system different from the LPWA, and a management server configured to detect a position of the target object from a first installation position at which the access point is installed and a second installation position at which the terminal is installed. The management server is configured to manage first identification information for identifying the first device and second identification information for identifying the second device in association with each other.

In the target object management system according to the present invention, the second device may be a radio frequency identification (RFID), and the terminal may be a reader/writer.

In the target object management system according to the present invention, the access point may be disposed in each area to be detected, and the terminal may be disposed at a location to be detected in the area.

In the target object management system according to the present invention, the first device may be configured to access a storage unit of the second device, a control information for the first device may be written and stored in the storage unit of the second device, and the first device may read the control information from the storage unit and an operating state of the first device may be changed.

A target object management server according to the present invention is a target object management server in which a first device and a second device are attached to a target object, and an access point configured to transmit and receive data to and from the first device in a predetermined first communication range by a communication system of a low power wide area (LPWA) is connected through an information communication network to a terminal configured to transmit and receive data to and from the second device in a second communication range narrower than the first communication range of the first device by a communication system different from the LPWA, in which the target object management server is configured to manage first identification information for identifying the first device and second identification information for identifying the second device in association with each other, and detect a position of the target object from a first installation position at which the access point is installed and a second installation position at which the terminal is installed.

A target object management method according to the present invention includes a step of, via a first device attached to a target object, transmitting and receiving data to and from an access point in a predetermined first communication range by a communication system of a low power wide area (LPWA), a step of, via a second device attached to the target object, transmitting and receiving data to and from a predetermined terminal in a second communication range narrower than the first communication range of the first device by a communication system different from the LPWA, a step of, via a management server, detecting a position of the target object from a first installation position at which the access point is installed and a second installation position at which the terminal is installed, and a step of, via the management server, managing first identification information for identifying the first device and second identification information for identifying the second device in association with each other.

According to the present invention, it is possible to provide the target object management system, the target object management server, and the target object management method capable of executing the position detection as to which position (location) the target object is within the communicable area of the LPWA.

BRIEF DESCRIPTION OF THE DRAWINGS

FIG. 3 is a diagram showing a configuration example of a target object management table of a management database.

DETAILED DESCRIPTION OF THE PREFERRED EMBODIMENTS

Figure 1:
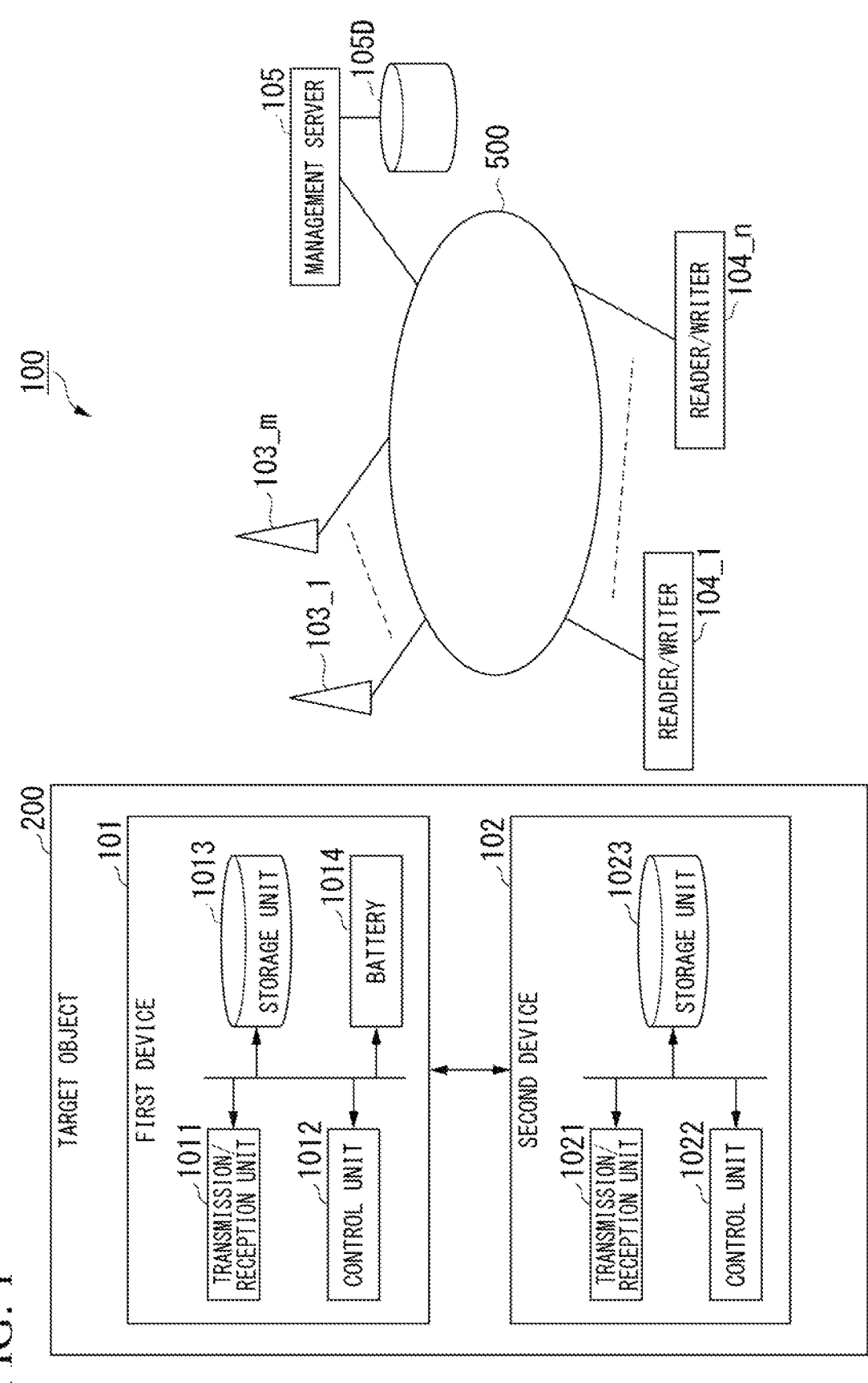
FIG. 1 is a block diagram showing a configuration example of a target object management system according to an embodiment of the present invention.

A target object management system according to an embodiment of the present invention will be described below with reference to the drawings. FIG. 1 is a block diagram showing a configuration example of the target object management system according to the embodiment of the present invention.

A target object management system 100 includes a first device 101, a second device 102, access points 103_1 to 103_m, readers/writers 104_1 to 104_n, and a management server (target object management server) 105. Hereinafter, the access points 103_1 to 103_m may be collectively referred to as an access point 103, and the readers/writers 104_1 to 104_n may be collectively referred to as a reader/writer 104.

The first device 101, the second device 102, the access points 103_1 to 103_m, the readers/writers 104_1 to 104_n, and the management server 105 are connected to each other through the information communication network 500 including the Internet.

The first device 101 is a communication module by a communication system of an LPWA, and is attached to a target object 200 as a target of which a position is detected.

Here, the first device 101 as a wireless module is an active system that operates by using the power of a battery (battery 1014 described later). The first device 101 has an LPWA module (transmission/reception unit 1011 described later), such as Sigfox (registered trademark), LoRa (registered trademark), or ZETA (registered trademark). In a case of the communication system of the LPWA, the consumption of the power at the time of transmission and reception is extremely small, and the LPWA is a communication system suitable for executing distant communication of information with a small data size.

In addition, as the LPWA, a plurality of systems are known. Any system may be used. Preferably, a communication system that can execute communication at a reach distance of data over a long distance (distance about from several hundred m to 1 km) is preferable.

The second device 102 is a passive system that operates by using the power of radio waves from the reader/writer. The second device 102 is a device having a communication system different from the LPWA of the first device 101, for example, a radio frequency identifier (RFID) tag. As the communication system of the RFID, it is preferable that data can be transmitted and received by wireless communication over a short distance (several cm to several m depending on a frequency band) using electromagnetic fields, the radio waves, or the like. The reader/writer 104 reads identification information RFID_ID of the RFID tag to detect a position of the RFID tag. In addition, as the second device 102, a beacon that measures a position of a transmitter by disposing a receiver (terminal) may be used instead of the RFID.

In the present embodiment, an example in which the RFID tag is used as the second device 102 will be described.

The access points 103_1 to 103_m are base stations in the communication of the LPWA, and specify a position at which the first device 101 is present, for example, by using a communicable range (communicable ranges 301A and 302A, and the like described later).

That is, in a case in which identification information LPWA_ID (hereinafter, first identification information) of the first device 101 is received, the access points 103_1 to 103_m transmit the first identification information and access point identification information that is identification information of the access points 103_1 to 103_m to the management server 105.

The readers/writers 104_1 to 104_n are terminals that transmit and receive the data to and from the RFID tag, and specify the position at which the second device 102 is present, for example, based on a communicable range (communicable ranges 301A and 302A, and the like described later).

That is, in a case in which identification information EFID_ID (hereinafter, second identification information) of the second device 102 is received, the readers/writers 104_1 to 104_n transmit the second identification information and reader/writer identification information that is identification information of the readers/writers 104_1 to 104_n to the management server 105.

Figure 2A:
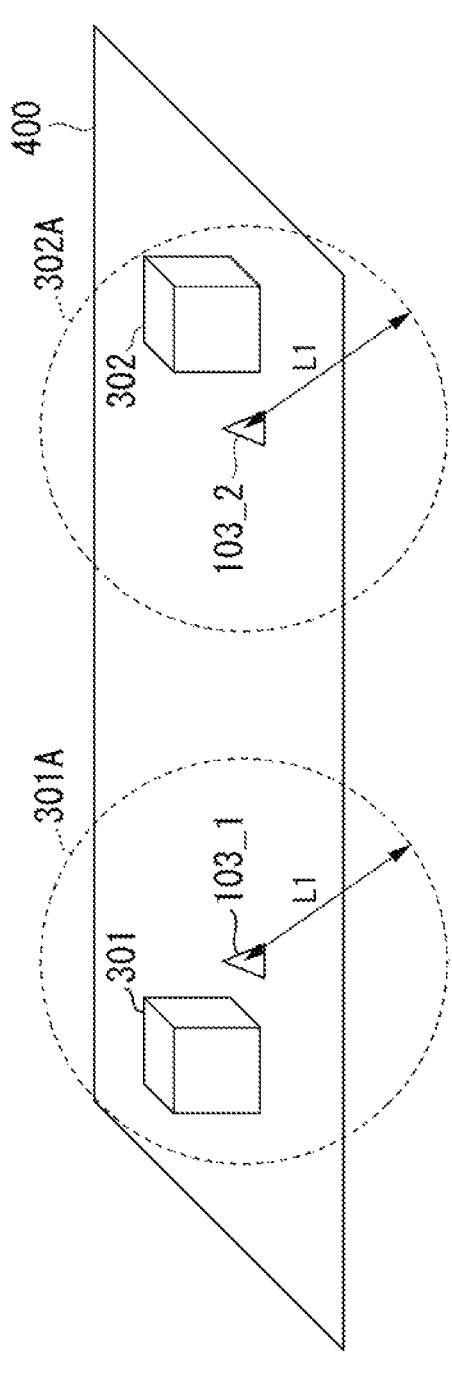
FIG. 2A is a conceptual diagram showing a correspondence relationship between installation of an access point and a communication distance range of a first device.

FIG. 2A is a conceptual diagram showing a correspondence relationship between the installation of the access point and the communication distance range of the first device.

Figure 2B:
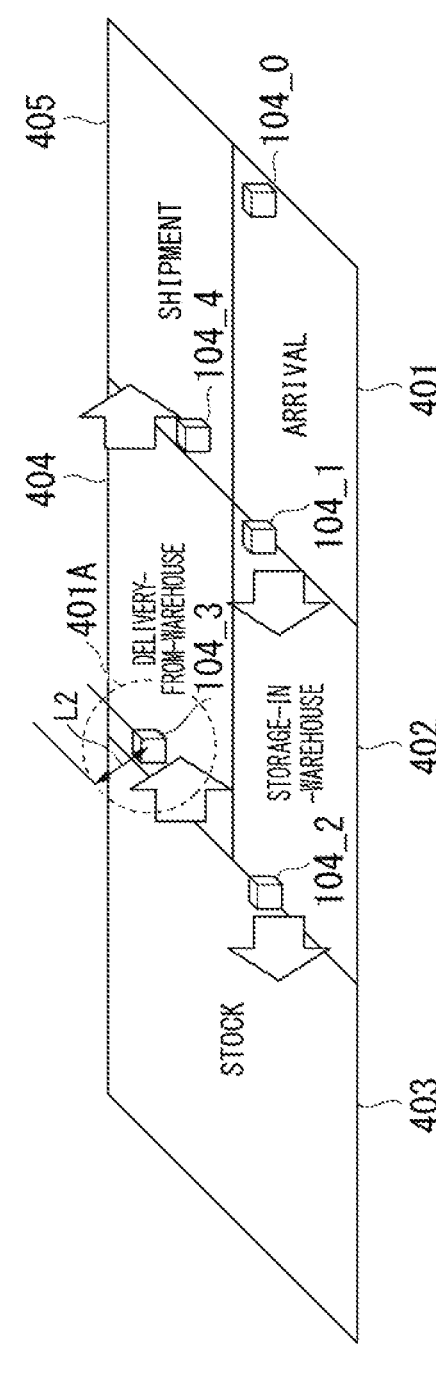
FIG. 2B is a conceptual diagram showing a correspondence relationship between installation of a reader/writer and a communication distance range of a second device.

FIG. 2B is a conceptual diagram showing a correspondence relationship between the installation of the reader/writer and the communication distance range of the second device.

FIG. 2A shows an installation example of the access point 103. The access point 103_1 can execute communication within a range of the communicable range 301A (radius L1, for example, 1 km: first communication range).

Since the communicable range 301A includes a building 301, in a case in which the access point 103_1 can transmit and receive the data to and from the first device 101, the access point 103_1 can detect that the first device 101 is located in or near the building 301.

Similarly, the access point 103_2 can execute communication within a range of the communicable range 302A (radius L1, for example, 500 m to 1 km, optionally set depending on the radio wave intensity: first communication range).

Since the communicable range 302A includes a building 302, in a case in which the access point 103_2 can transmit and receive the data to and from the first device 101, the access point 103_2 can detect that the first device 101 is located in or near the building 302.

Accordingly, each of the access points 103_1 and 103_2 detects whether the first device 101 is located in the building 301 (for example, a factory building) or the building 302 (for example, a warehouse) disposed in a site (area) 400. That is, each of the access points 103_1 and 103_2 can detect whether the target object 200 (for example, an industrial product) to which the first device 101 is attached is located in the building 301 or the building 302.

FIG. 2B shows an installation example of the reader/writer 104 in the building 302 (warehouse). Each of the readers/writers 104_1, 104_2, 104_3, and 104_4 can execute communication within a range of a communicable range 401A (radius L2, for example, 30 cm to 10 m: second communication range). The communicable range 401A is narrower than the communicable range 301A and the communicable range 302A.

In FIG. 2B, for example, the reader/writer 104_1 is provided at a gate for transporting the target object 200 from an arrival area 401 to a storage-in-warehouse area 402. In addition, the reader/writer 1042 is provided at agate for transporting the target object 200 from the storage-in-warehouse area 402 to a stock area 403. The reader/writer 1043 is provided at a gate for transporting the target object 200 from the stock area 403 to a delivery-from-warehouse area 404. The reader/writer 104_4 is provided at a gate for transporting the target object 200 from the delivery-from-warehouse area 404 to a shipment area 405.

Accordingly, in a case in which the data is transmitted and received to and from the second device 102, the reader/writer 104_1 detects that the target object 200 to which the second device 102 is attached is transported from the arrival area 401 to the storage-in-warehouse area 402. That is, the reader/writer 104_1 detects that the target object 200 is located in the storage-in-warehouse area 402. Similarly, in a case in which the data is transmitted and received to and from the second device 102, the reader/writer 104_2 detects that the target object 200 to which the second device 102 is attached is transported from the storage-in-warehouse area 402 to the stock area 403. That is, the reader/writer 104_2 detects that the target object 200 is located in the stock area 403.

In addition, in a case in which the data is transmitted and received to and from the second device 102, the reader/writer 104_3 detects that the target object 200 to which the second device 102 is attached is transported from the stock area 403 to the delivery-from-warehouse area 404. That is, the reader/writer 104_3 detects that the target object 200 is located in the delivery-from-warehouse area 404. Similarly, in a case in which the data is transmitted and received to and from the second device 102, the reader/writer 104_4 detects that the target object 200 to which the second device 102 is attached is transported from the delivery-from-warehouse area 404 to the shipment area 405. That is, the reader/writer 104_4 detects that the target object 200 is located in the shipment area 405.

Accordingly, each of the readers/writers 104_1 to 104_4 can detect whether the target object 200 is located in, for example, the storage-in-warehouse area 402, the stock area 403, the delivery-from-warehouse area 404, and the shipment area 405 in the warehouse (building 302).

In addition, by providing the reader/writer 104_0 at a gate for carrying the target object in the arrival area 401, it is possible to detect that the target object 200 is located in the arrival area 401.

Returning to FIG. 1, in a case in which each of the first identification information and the access point identification information is received from the access point 103, the management server 105 writes and stores a first installation position indicating a disposition position of the access point 103 corresponding to the first identification information as target object first position information in a management table of the management database 105D.

In this case, the management server 105 reads out the first installation position as the position information corresponding to the access point identification information of the access point 103 by referring to an access point management table (not shown).

In addition, in a case in which each of the second identification information and the reader/writer identification information is received from the reader/writer 104, the management server 105 writes and stores a second installation position indicating a disposition position of the reader/writer 104 corresponding to the second identification information as target object second position information in a target object management table of the management database 105D.

In this case, the management server 105 reads out first disposition information as the position information corresponding to the access point identification information of the reader/writer 104 by referring to a reader/writer management table (not shown).

In addition, in a case in which a user inputs user identification information to the terminal and transmits information requesting the acquisition of the information of the target object 200 to the management server 105, the management server 105 notifies the terminal of the user of the information of the corresponding target object 200.

That is, in a case in which the user identification information of the user is supplied from the terminal of the user, the management server 105 permits the user to access the target object management table corresponding to the user identification information in the management database 105D.

Then, by inputting the identification information of any one of the first identification information or the second identification information corresponding to the target object 200 from the terminal after the user is permitted to access the target object management table of the management database 105D, the terminal transmits the identification information to the management server 105.

In a case in which the identification information of any one of the first identification information or the second identification information is supplied from the terminal of the user, the management server 105 transmits information of a record corresponding to the identification information in the target object management table in the management database 105D to the terminal of the user.

In this case, the management server 105 combines each of the target object first position information and the target object second position information, combines, for example, an address and a name of the building, including an area and a location, and room information, converts the combined information into position information indicating that the position is in a room on which floor of a building with what name at the shown address, gives a notification to the terminal of the user.

In addition, the user can acquire first device set value information that is information of a set value of the first device 101 and a first device operating flag from the target object management table in the management database 105D via the terminal and the management server 105.

FIG. 3 is a diagram showing a configuration example of the target object management table of the management database 105D.

The target object management table is provided for each user, such as a company or an organization, is managed by the user identification information of the user, and cannot be referred to by another user.

In the target object management table, for each record, a column of each of the first identification information, the second identification information, target object information, the target object first position information, the target object second position information, the first device set value information, and the first device operating flag is provided.

Here, the first identification information is identification information of the communication module having the system of the LPWA, which is the first device 101.

The second identification information is identification information of the RFID tag that is the second device 102.

The target object information is information indicating a type or the like of the target object 200, and is, for example, a name or a category of the object that is moved by transport, such as a home appliance, furniture, a marine product, an agricultural product, a mailed item, and a publication.

Specific exemplary examples of the target object 200 include objects, such as a home appliance, furniture, a marine product, an agricultural product, a mailed item, a publication, or a mechanical component. In addition, exemplary examples of the target object 200 include a storage body, such as a package, a box, or a container in which these objects are stored, and a pallet on which the storage body is placed.

The target object first position information is first disposition information acquired by the management server 105 using the access point identification information of the access point 103, and is position information indicating a predetermined area, such as an address, a business name, or a building name at which the access point 103 is disposed.

The target object second position information is second disposition information acquired by the management server

105 based on the reader/writer identification information of the reader/writer 104, and is position information indicating a predetermined location, such as a carrying-in gate, a carrying-out gate, or an entrance of a room (what room number on which floor) in which the reader/writer 104 is disposed.

The first device set value information indicates a set value related to communication of the communication module having the system of the LPWA, which is the first device 101, or the like. Exemplary examples of the set value include a length (time, for example, 10 minutes, 1 hour, or the like) of a transmission period, a frequency of the radio waves to be transmitted, and an intensity of the radio waves to be transmitted.

The first device operating flag is a flag indicating whether the first device 101 operates or is stopped (sleep mode), for example, indicates that the first device 101 is stopped in a case in which the flag is "1" (in a case in which the flag is raised), and indicates that the first device 101 operates in a case in which the flag is "0" (in a case in which the flag is not raised).

As described above, the first identification information and the second identification information are managed in association with each other in the target object management table.

Therefore, even in a case in which the user recognizes only the identification information of any one of the first device 101 and the second device 102, the management information of the target object 200 to which the first device 101 and the second device 102 are attached as a set can be referred to in the target object management table.

Further, the first installation position of the target object and the second installation position of the target object are combined and stored in the target object management table.

For this reason, in a case in which the first installation position of the target object indicates a first warehouse (area at the position) in Yokohama and the second installation position of the target object indicates a carrying-in gate (location at the position) of the stock area, it is possible to detect that the target object 200 is located in the stock area of the first warehouse in Yokohama by combining the first installation position of the target object and the second installation position of the target object.

Returning to FIG. 1, the first device 101 includes each of the transmission/reception unit 1011 (communication module having the system of the LPWA), a control unit 1012, a storage unit 1013, and the battery 1014.

The control unit 1012 transmits the first identification information of the first device 101 to the access point 103 in a predetermined transmission period by using the radio waves of a predetermined wavelength and a predetermined intensity through the transmission/reception unit 1011.

The storage unit 1013 stores information, such as the first identification information, the transmission period, the wavelength, and the intensity. In a case in which the control unit 1012 executes the processing of transmitting the radio waves, the control unit 1012 reads out the information, such as the first identification information, the transmission period, the wavelength, and the intensity, by referring to the storage unit 1013. The storage unit 1013 is, for example, a non-volatile memory, such as an electrically erasable programmable read-only memory (EEPROM) in which electrical data can be rewritten.

The battery 1014 supplies the power required for driving each of the first device 101 and a shared area in a storage unit 1023 described later.

In addition, the second device 102 includes each of a transmission/reception unit 1021 (communication module having the communication system of the RFID), a control unit 1022, and a storage unit 1023.

The control unit 1022 transmits the second identification information of the second device 102 in the transmission and reception of the data to and from the reader/writer 104.

The storage unit 1023 stores the information, such as the second identification information. In a case in which the control unit 1012 executes the processing of transmitting the radio waves, the control unit 1012 reads out information, such as the second identification information, by referring to the storage unit 1023. Similarly to the storage unit 1013, the storage unit 1023 is, for example, a non-volatile memory, such as an EEPROM in which electrical data can be rewritten.

In addition, the storage unit 1023 is provided with a shared storage area that is a storage area in which the first device 101 is accessible.

In a case in which the set value to be changed in the first device 101 is supplied from the reader/writer 104, the second device 102 writes and stores the supplied set value in the shared storage area of the storage unit 1023. In the shared storage area, for example, an area in which the transmission period, the wavelength, the intensity, and the like are written is set.

Each of the first device 101 and the second device 102 is configured to transmit and receive the data by using, for example, an interface, such as an inter integrated circuit (I2C) or a serial peripheral interface (SPI).

In a case in which the data is written in the shared area of the storage unit 1023, the second device 102 notifies the first device 101 that the set value is changed.

Accordingly, the first device 101 refers to numerical values of the transmission period, the wavelength, and the intensity in the shared area of the storage unit 1023, extracts data different from the transmission period, the wavelength, and the intensity stored in the storage unit 1013, and reads out the extracted data from the shared area of the storage unit 1023.

Then, the first device 101 writes and stores the data read out from the shared area of the storage unit 1023 to a corresponding location (storage area for the transmission period, the wavelength, the intensity, and the like) in the storage unit 1013.

As described above, since the set value can only be changed by wire with respect to the first device 101, the set value written at the time of manufacture and shipment cannot be easily rewritten wirelessly after distribution. The set value of the first device 101 can be wirelessly rewritten through the second device 102.

By providing the operating flag indicating whether or not to stop the operation in the shared area of the storage unit 1023, the first device can be optionally made to transition between operation states of the operating state and the stopped state through the second device 102. Here, the stopped state indicates a power-saving sleep mode, such as reducing an operation frequency of a central processing unit (CPU) inside the control unit 1012 without transmitting the radio waves.

In a case in which the operating flag in the shared area of the storage unit 1023 is rewritten, the control unit 1022 of the second device 102 notifies the first device 101 that the operation state is changed.

Accordingly, the control unit 1012 of the first device 101 refers to the operating flag in the shared area of the storage unit 1023, compares the operating flag with the operating flag stored at the corresponding location of the storage unit 1013, and rewrites the operating flag to the value of the operating flag in the shared area of the storage unit 1023 in a case in which the operating flags are different.

Then, the control unit 1012 of the first device 101 transitions the operation state of the first device 101 to any one of the operating state or the stopped state according to the operation state indicated by the operating flag.

Figure 4A:
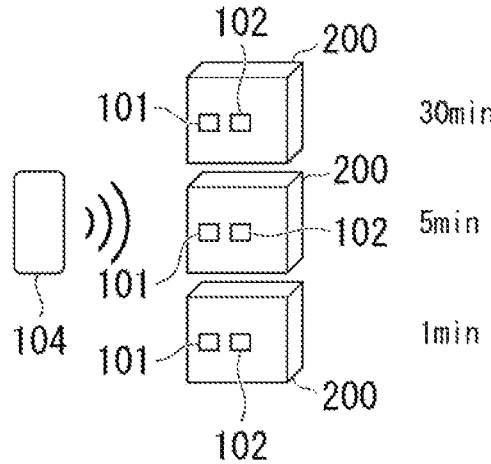
FIG. 4A is a diagram showing a change in a transmission period of radio waves of a transmission/reception unit in the first device.
Figure 4B:
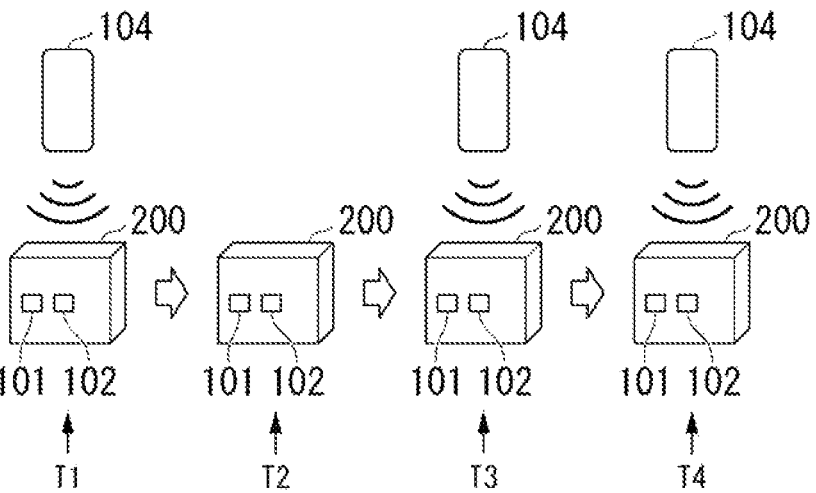
FIG. 4B is a diagram showing an operating state of the first device based on rewriting of an operating flag in a storage unit of the second device.

FIGS. 4A and 4B are conceptual diagrams showing examples of changing the set value of the first device through the second device.

FIG. 4A shows a change in the transmission period of the radio waves of the transmission/reception unit 1011 in the first device 101.

In FIG. 4A, by writing 30 min (minutes), 5 min, and 1 min as the numerical values (time) of the transmission period in a data area of the transmission period in the shared area of the storage unit 1023 of the second device 102 by the reader/writer 104, the first device 101 accesses the shared area of the storage unit 1023.

Then, the control unit 1012 of the first device 101 changes the transmission period (control information) of the radio waves to 30 min, 5 min, 1 min, or the like read from the shared area of the storage unit 1023.

Here, in a case in which the set value is changed, the reader/writer 104 transmits the numerical value of the changed set value together with the second identification information of the reader/writer 104, which executes writing, to the management server 105.

Accordingly, the management server 105 rewrites the first device set value information in the record of the corresponding second identification information in the target object management table of the management database 105D.

FIG. 4B shows the operating state of the first device 101 based on rewriting of the operating flag in the storage unit 1023 of the second device 102.

At a time T1, the operating flag in the shared area of the storage unit 1023 of the second device 102 is rewritten from the stopped state (flag is "1") to the operating state (flag is "0") by the reader/writer 104.

In addition, at a time T3, the operating flag in the shared area of the storage unit 1023 of the second device 102 is rewritten from the operating state (flag is "0") to the stopped state (flag is "1") by the reader/writer 104.

Accordingly, the first device 101 is in the operating state during a time T2 between the time T1 and the time T3.

Then, at a time T4, the operating flag in the shared area of the storage unit 1023 of the second device 102 is rewritten from the stopped state (flag is "1") to the operating state (flag is "0") by the reader/writer 104.

Accordingly, the first device 101 is in the stopped state during the time between the time T3 and the time T4.

Here, in a case in which the target object 200 is stored in the warehouse, the target object 200 is not moved and it is not required to transmit the radio waves. Therefore, the first device 101 is in the stopped state to suppress the consumption of the power from the battery 1014.

For example, in FIG. 2B, in a case of transport from the storage-in-warehouse area 402 to the stock area 403, since the reader/writer 104_2 transmits the first identification information and the reader/writer identification information to the management server 105 and then changes the operating state to the stopped state, the operating flag in the storage unit 1023 of the second device 102 is rewritten from "0" to "1".

On the other hand, in a case of transport from the stock area 403 to the delivery-from-warehouse area 404, since the reader/writer 104_3 transmits the first identification information and the reader/writer identification information to the management server 105 and then changes the stopped state to the operating state, the operating flag in the storage unit 1023 of the second device 102 is rewritten from "1" to "0".

In addition, it is possible to detect another moving position of the target object 200, such as being placed on an airplane or being placed on a ship, and even in a case in which the target object 200 is not moved from the position, the battery 1014 is in the stopped state in order to suppress the consumption of the power from the battery 1014.

In the operation example of FIG. 4B described above, the processing will be described as processing executed after the first identification information is received in a case in which the target object 200 passes through the gate for carrying-in and carrying-out at which the reader/writer 104 is installed.

However, a person in charge may manually carry out the processing at any timing using a portable reader/writer (application of a terminal, such as a smartphone).

Here, in a case in which the operating flag is changed, the reader/writer 104 transmits the numerical value of the changed operating flag together with the second identification information of the reader/writer 104, which executes writing, to the management server 105.

Accordingly, the management server 105 rewrites the first device operating flag in the record of the corresponding second identification information in the target object management table of the management database 105D.

Figure 4C:
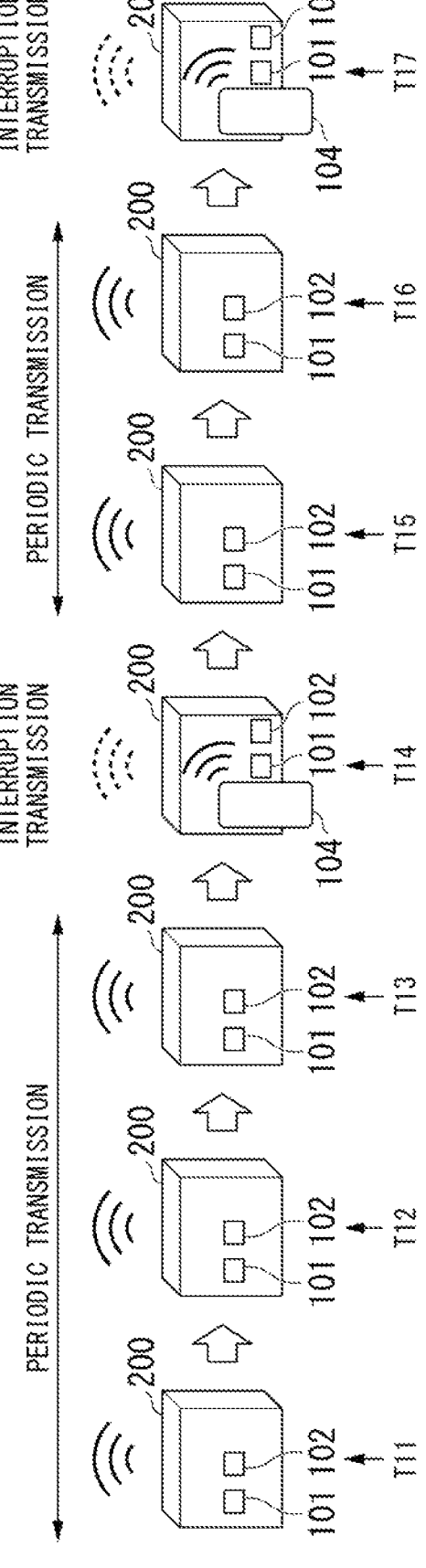
FIG. 4C is a diagram showing an example in which the first device transmits the radio waves at any timing regardless of a period of periodic transmission by a portable reader/writer.

FIG. 4C shows an example in which the first device 101 transmits the radio waves at any timing regardless of a period of periodic transmission by the portable reader/writer 104.

At each of a time T11, a time T12, a time T15, and a time T16, for example, as the set value, the radio waves are transmitted once every 30 min. That is, each time between the time T11, the time T12, the time T15, and the time T16 is a time at an interval of the period, for example, 30 min.

Then, at the time T14 (for example, 15 min after the time T13 in a case in which the time interval of the transmission period is 30 min) or at a time T17, by setting a flag for executing radio wave transmission in the shared area of the storage unit 1023 by using the reader/writer 104, it is possible to cause the first device 101 to execute interruption transmission of the radio waves.

In this case, the reader/writer 104 rewrites an interruption transmission flag in the shared area of the storage unit 1023 of the second device 102 from "0" to "1". In a case in which the transmission flag is set to "I", the interruption transmission is executed.

The control unit 1022 of the second device 102 notifies the first device 101 that the interruption transmission flag in the shared area of the storage unit 1023 is rewritten.

Accordingly, the first device 101 refers to the interruption transmission flag in the shared area of the storage unit 1023.

Then, the control unit 1012 of the first device 101 transmits the radio waves by using the transmission/reception unit 1011 as the interruption transmission.

In addition, in a case in which the notification is given from the first device 101 that the interruption transmission flag in the shared area of the storage unit 1023 is referred to, the control unit 1022 of the second device 102 resets the interruption transmission flag to "0".

Figure 5:
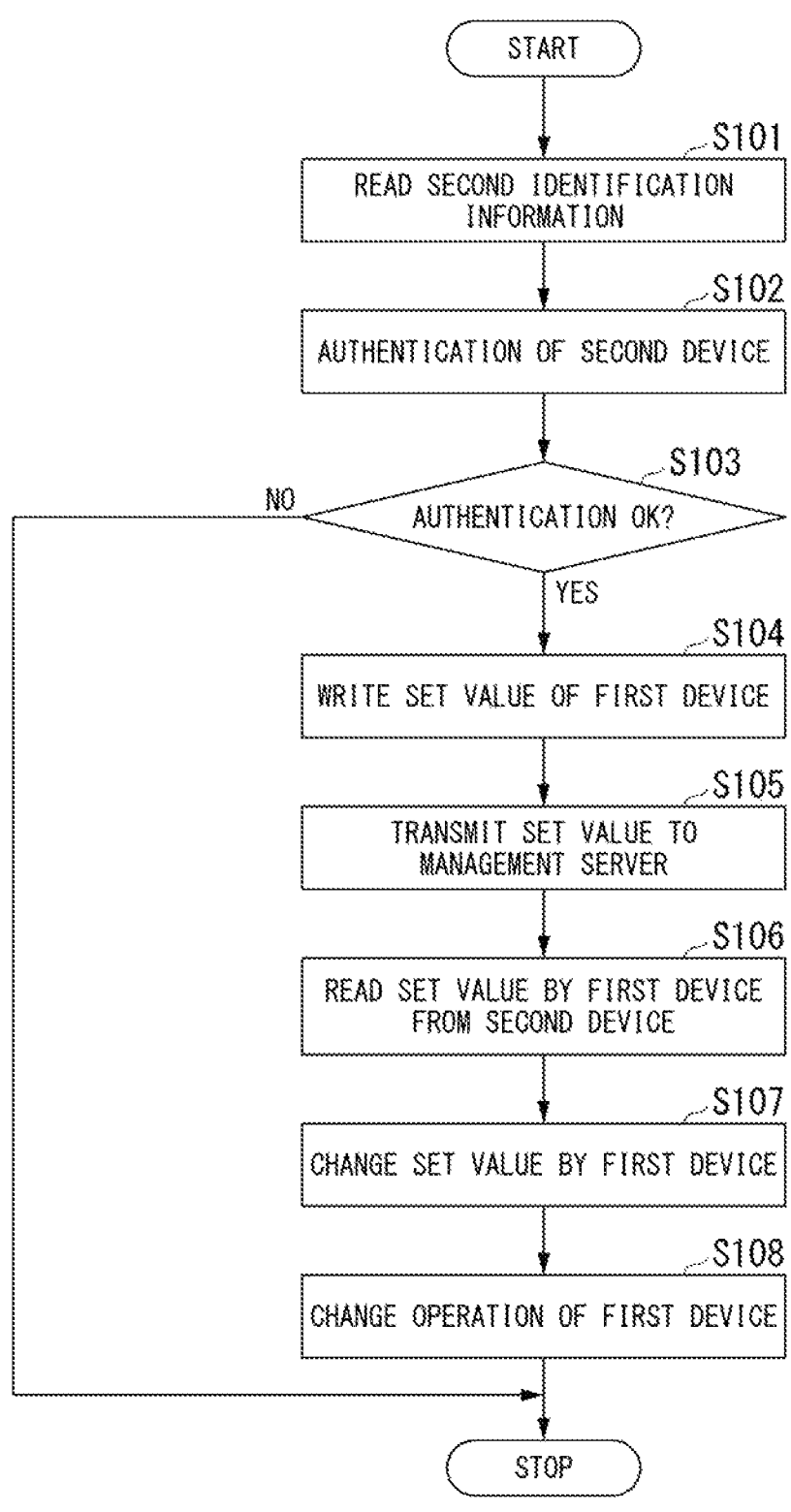
FIG. 5 is a flowchart showing an operation example of processing of changing a set value of the first device in the target object management system according to the embodiment of the present invention.

FIG. 5 is a flowchart showing an operation example of processing of changing the set value of the first device in the target object management system according to the embodiment of the present invention. In the below description, the second device is configured to generate a one-time password as a password for authentication. A target object management method using the target object management system will be described below.

Step S101:

The reader/writer 104 transmits a control signal for transmitting the second identification information to the second device 102 together with a predetermined character string.

The predetermined character string is acquired from the management server 105 in a case in which the reader/writer 104 rewrites the set value of the first device and executes the authentication of the second device 102.

Accordingly, the control unit 1022 of the second device 102 reads out the second identification information from the storage unit 1023 and generates the one-time password from the character string by a predetermined calculation expression.

Then, the control unit 1022 of the second device 102 transmits the second identification information and the one-time password to the reader/writer 104 through the transmission/reception unit 1021.

The reader/writer 104 receives (reads) the second identification information and the one-time password transmitted from the second device 102.

Step S102:

The reader/writer 104 transmits the second identification information and the one-time password supplied from the second device 102 to the management server 105 to request the authentication of the second device 102.

The management server 105 searches for the second identification information of the second device for which the request is given, by referring to the target object management table of the management database 105D.

Then, in a case in which the second identification information is detected in the target object management table of the management database 105D, the management server 105 verifies true/false of the one-time password by using the predetermined calculation expression and the character string transmitted by the management server 105.

Step S103:

In a case in which the second identification information is present in the target object management table of the management database 105D and the one-time password is true, the management server 105 determines that the correct authentication is made (authentication is OK) and transmits the fact that the authentication is OK to the reader/writer 104.

Accordingly, the reader/writer 104 proceeds with the processing to step S104.

On the other hand, in a case in which the second identification information is not present in the target object management table of the management database 105D or the one-time password is false, the management server 105 determines that the correct authentication is not made (authentication is not OK) and transmits the fact that the authentication is not OK to the reader/writer 104.

The reader/writer 104 displays a notification on a display screen (not shown) that the second device 102 is not a correct device.

Accordingly, the person in charge terminates the processing without changing the set value using the reader/writer 4.

Step S104:

The reader/writer 104 writes and stores the set value (for example, a numerical value of a new transmission period) related to the operation of the first device 101 which is input by the person in charge, to the shared area of the storage unit 1023 of the second device 102.

Then, the control unit 1022 of the second device 102 notifies the first device 101 that the set value is written in the shared area of the storage unit 1023.

Step S105:

Further, the control unit 1022 of the second device 102 reads out the second identification information of the second device 102 from the storage unit 1023.

The reader/writer 104 transmits the set value (set value related to the operation of the first device 101) written in the shared area of the storage unit 1023 of the second device 102 to the management server 105 together with the read out second identification information.

Accordingly, the management server 105 rewrites the first device set value information in the record corresponding to the second identification information in the target object management table of the management database 105D with the received set value.

Step S106:

In a case in which a notification indicating that the set value is written in the shared area of the storage unit 1023 is received from the second device 102, the control unit 1012 of the first device 101 accesses and refers to the shared area of the storage unit 1023.

Then, the control unit 1012 of the first device 101 reads out the set value written in the shared area of the storage unit 1023.

Step S107:

The control unit 1012 of the first device 101 changes the set value by overwriting the set value read out from the shared area of the storage unit 1023 to a predetermined area in which the set value is written in the storage unit 1013.

Step S108:

Then, the control unit 1012 of the first device 101 controls the first device 101 by the set value read out from the predetermined area in the storage unit 1013.

For example, in a case in which the set value is the transmission period and the period width is changed from 10 min to 30 min, the control unit 1012 of the first device 101 changes the operation such that the transmission/reception unit 1011 transmits the radio waves every 30 min, not every 10 min.

In the above, the change of the set value is described with the transmission period. However, for example, in a case in which the target object 200 is transported to another country or the like by a ship or an airplane, the standards in the communication system of the LPWA may be different between the country of departure and the country of arrival, and the frequency band of the usable radio waves may be different.

For this reason, in a case in which the target object 200 is carried in the country or a region in which the standards in the communication system of the LPWA are different, the position of the target object 200 is detected, and the tracking of the transport path is started. Therefore, in a case in which the operating flag is made to transition from "1" to "0" to transmit the radio waves to start or restart position detection processing, it is also possible to change the set value of the wavelength of the radio waves to be transmitted.

A specific procedure of changing a frequency band in the system of the LPWA will be described.

First, the second device 102 writes the value related to the position information with the reader/writer 104, reads the written value related to the position information from the first device 101, and changes the setting of the communication frequency.

Since the circuit (beacon) only for transmission is assumed as the first device 101, the first device 101 does not have a reception function.

From the above, in the present embodiment, in a case in which the frequency band is changed, since a highly functional configuration, such as a listening module, is not required, it is possible to execute handling at a low cost.

In addition, as another configuration example of the present embodiment, an operation may be executed with a function of detecting a state of the environment around the target object 200 by connecting various sensors (for example, sensors that measure temperature, humidity, altitude, acceleration, magnetic field, chemical substance, gas concentration, and the like) to each of the first device 101 and the second device 102.

For example, in a case in which the target object 200 is a package in which fresh food is packaged, the temperature or the humidity in the environment in which the target object 200 is located can be measured by the sensor and monitored, and whether or not the freshness of the fresh food can be maintained can be determined.

Since the second device 102 is the passive system, a configuration is adopted in which the sensor itself is mounted with the battery or the power is supplied from the battery 1014 of the first device 101.

Then, the transmission/reception unit 1011 may transmit measured values of a measurement target (for example, temperature, humidity, altitude, acceleration, magnetic field, chemical substance, gas concentration, and the like) acquired by the control unit 1012 from the sensors connected to the first device 101, by adding the first identification information, to the management server 105 through the access point 103. In addition, the transmission/reception unit 1021 of the second device 102 may transmit the measured values, by adding the second identification information, to the management server 105 through the reader/writer 104.

Similarly, the transmission/reception unit 1021 may transmit the measured values of the measurement target (for example, temperature, humidity, altitude, acceleration, magnetic field, chemical substance, gas concentration, and the like) acquired by the control unit 1022 from the sensors connected to the second device 102, by adding the second identification information, to the management server 105 through the reader/writer 104, or the transmission/reception unit 1011 of the first device 101 may transmit the measured values, by adding the first identification information, to the management server 105 through the access point 103.

In addition, the sensors may be configured to detect a voltage or a current. For example, a configuration is adopted in which a loop-shaped wire is formed by a conductor (conductive ink, conductive object, or the like) in an opening portion of the above-described package which is the target object 200, and the wire is disconnected when the package is opened.

Then, since the normal detection consumes a large amount of the power of the battery, in a predetermined period (for example, 30 minutes, 1 hour, and the like) and a predetermined time (time during which the voltage and the current can be measured, for example, 1 msec (seconds) or 5 msec), by measuring a value of the voltage in the wire or a value of the current flowing through the wire, it is possible to detect whether or not the wire is disconnected and to determine that the package is opened.

With the configuration described above, according to the present embodiment, by adding each of the first device 101 and the second device 102 to one target object 200 and using the first identification information of the first device 101 attached to the target object 200 and the second identification information of the second device 102 attached to the target object 200 in the target object management table of the management database 105D in conjunction with each other by the management server 105, it is possible to easily manage the information of the target object 200 by only using any one identification information.

In addition, according to the present embodiment, by reading out the first installation position in a unit of an area (surface) based on the disposition position of the access point 103 that transmits and receives the data to and from the first device 101 and the second installation position in a unit of a location (point) unit based on the disposition position of the reader/writer 104 that transmits and receives the data to and from the second device 102 in the target object management table of the management database 105D in conjunction each of the first identification information and the second identification information, to combine each of the target object first position information (first installation position) and the target object second position information (second installation position) into one position information, so that it is possible to detect the position at which the target object 200 is present with high accuracy.

In addition, according to the present embodiment, in a case in which the first device 101 has a configuration in which the data can only be written by wire when the set value is written in the predetermined area of the storage unit 1013 of the first device 101 (for example, in a case in which the first device 101 is ZETA (registered trademark)), it is possible to change the set value in the predetermined area of the storage unit 1013 of the first device 101 through the storage unit 1023 of the second device 102. Accordingly, the operation state of the first device 101 can be changed at any timing during the transport.

In addition, according to the present embodiment, in a case in which the first device 101 has a configuration in which the operating flag can only be rewritten by wire when the information for stopping the operation is written in the operating flag of the storage unit 1013 of the first device 101 (for example, in a case in which the first device 101 is ZETA (registered trademark)), it is possible to rewrite the operating flag of the storage unit 1013 of the first device 101 through the storage unit 1023 of the second device 102. Accordingly, the first device 101 can be made to transition between the operating state and the stopped state at any timing during the transport, the consumption of the power of the battery 1014 can be reduced, and the operation time can be easily extended.

It should be noted that a program for realizing each of the functions of the first device 101, the second device 102, and the management server 105 of FIG. 1 in the present invention may be recorded on a computer-readable recording medium, and is recorded on the recording medium, and the program recorded on the recording medium may be read into the computer system and executed to execute processing corresponding to the function of the first device 101, the function of the second device 102, and the function of the management server 105. It should be noted that, here, the term "computer system" includes an operating system (OS) or hardware such as a peripheral device. The term "computer system" also includes a world wide web (WWW) system provided with a homepage providing environment (or display environment). In addition, the term "computer-readable recording medium" refers to a portable medium, such as a flexible disk, a magneto-optical disk, a read only memory (ROM), and a compact disc read only memory (CD-ROM), and a storage device, such as a hard disk built in a computer system. Further, the term "computer-readable recording medium" also includes a recording medium that holds a program for a certain time, such as a volatile memory (random access memory (RAM)) inside the computer system that serves as a server or a client in a case in which the program is transmitted through a network, such as the Internet, or a communication line, such as a telephone line.

In addition, the program described above may be transmitted from the computer system in which the program is stored in the storage device or the like to another computer system through a transmission medium or by a transmission wave in the transmission medium. Here, the term "transmission medium" that transmits the program refers to a medium having a function of transmitting information such as a network (communication network), such as the Internet, or a communication line, such as a telephone line. The program described above may be a program for realizing a part of the functions described above. Further, the program described above may be a program, a so-called difference file (difference program) for realizing the functions by a combination with the program already recorded in the computer system.

The embodiment of the present invention has been described in detail above with reference to the drawings. The specific configuration is not limited to this embodiment, and designs and the like are included within the scope of the gist of the present invention.

INDUSTRIAL APPLICABILITY

According to the present invention, it is possible to provide the target object management system, the target object management server, and the target object management method capable of executing the position detection as to which position (location) the target object is within the communicable area of the LPWA.

What is claimed is:

1. A target object management system comprising:
   a first device attached to a target object and configured to transmit and receive data to and from an access point in a predetermined first communication range by a communication system of a low power wide area (LPWA);
   a second device attached to the target object and configured to transmit and receive data to and from a predetermined terminal in a second communication range narrower than the first communication range of the first device by a communication system different from the LPWA; and
   a management server configured to detect a position of the target object from a first installation position at which the access point is installed and a second installation position at which the terminal is installed,
   wherein the management server is configured to manage first identification information for identifying the first device and second identification information for identifying the second device in association with each other, and
   wherein the first device is configured to access a storage unit of the second device,
   a control information for the first device is written and stored in the storage unit of the second device, and
   the first device reads the control information from the storage unit and an operating state of the first device are changed.

2. The target object management system according to claim 1, wherein the second device is a radio frequency identification (RFID), and the terminal is a reader/writer.

3. The target object management system according to claim 1, wherein the access point is disposed in each area to be detected, and the terminal is disposed at a location to be detected in the area.

4. A target object management server in which a first device and a second device are attached to a target object, and an access point configured to transmit and receive data to and from the first device in a predetermined first communication range by a communication system of a low power wide area (LPWA) is connected through an information communication network to a terminal configured to transmit and receive data to and from the second device in a second communication range narrower than the first communication range of the first device by a communication system different from the LPWA, wherein the target object management server is configured to manage first identification information for identifying the first device and second identification information for identifying the second device in association with each other, and detect a position of the target object from a first installation position at which the access point is installed and a second installation position at which the terminal is installed, and wherein the first device is configured to access a storage unit of the second device, a control information for the first device is written and stored in the storage unit of the second device, and the first device reads the control information from the storage unit and an operating state of the first device are changed.

5. A target object management method comprising:

a step of, via a first device attached to a target object, transmitting and receiving data to and from an access point in a predetermined first communication range by a communication system of a low power wide area (LPWA);

a step of, via a second device attached to the target object, transmitting and receiving data to and from a predetermined terminal in a second communication range narrower than the first communication range of the first device by a communication system different from the LPWA;

a step of, via a management server, detecting a position of the target object from a first installation position at which the access point is installed and a second installation position at which the terminal is installed; and a step of, via the management server, managing first identification information for identifying the first device and second identification information for identifying the second device in association with each other, a step of, with the first device, accessing a storage unit of the second device, a step of writing and storing a control information for the first device in the storage unit of the second device, and a step of reading, with the first device, the control information from the storage unit and changing an operating state of the first device.

* * * * *